US012631258B2

(12) United States Patent
Nielsen

(10) Patent No.: US 12,631,258 B2
(45) Date of Patent: May 19, 2026

(54) FLOW CONTROL ARRANGEMENT AND METHOD OF CLEANING SUCH AN ARRANGEMENT

(71) Applicant: ALFA LAVAL CORPORATE AB, Lund (SE)

(72) Inventor: Jesper Bak Nielsen, Vejen (DK)

(73) Assignee: ALFA LAVAL CORPORATE AB, Lund (SE)

( * ) Notice: Subject to any disclaimer, the term of this patent is extended or adjusted under 35 U.S.C. 154(b) by 20 days.

(21) Appl. No.: 18/699,563

(22) PCT Filed: Oct. 10, 2022

(86) PCT No.: PCT/EP2022/078132
§ 371 (c)(1),
(2) Date: Apr. 8, 2024

(87) PCT Pub. No.: WO2023/061953
PCT Pub. Date: Apr. 20, 2023

(65) Prior Publication Data
US 2024/0401704 A1 Dec. 5, 2024

(30) Foreign Application Priority Data
Oct. 15, 2021 (EP) .................................... 21202909

(51) Int. Cl.
*F16K 1/44* (2006.01)
*F16K 31/122* (2006.01)

(52) U.S. Cl.
CPC ............ *F16K 1/446* (2013.01); *F16K 31/122* (2013.01)

(58) Field of Classification Search
CPC .............................. F16K 1/446; F16K 31/1221
See application file for complete search history.

(56) References Cited

U.S. PATENT DOCUMENTS 4,304,251 A * 12/1981 Schadel .................. F16K 25/02
251/285
4,373,545 A 2/1983 Knappe
(Continued)

FOREIGN PATENT DOCUMENTS

| CN | 101737524 B | 2/2012 |
| CN | 102297272 B | 11/2012 |

(Continued)

OTHER PUBLICATIONS

Liquid Process Equipment, LLC., "Mixproff Valves", Copyright © 2015 Liquid Process Equipment, exact publication date unknown, but prior to Oct. 15, 2021. (6 pages).
(Continued)

*Primary Examiner* — Hailey K. Do
(74) *Attorney, Agent, or Firm* — BUCHANAN INGERSOLL & ROONEY PC

(57) ABSTRACT

A flow control arrangement comprising a first and a second valve member, wherein the second valve member is, at an end facing the first valve member, formed with a circumferentially extending ring-shaped surface facing with a major component in a longitudinal direction, a recess being surrounded by the ring-shaped surface and being configured to receive a portion of the first valve member, and a circumferentially extending edge formed in a transition between the ring-shaped surface and the recess, wherein a second circumferentially extending gasket of the first valve member is configured to sealingly interact with the circumferentially extending edge of the second valve member when the double valve is in the open state. Also disclosed is a method of cleaning such a flow control arrangement.

24 Claims, 4 Drawing Sheets

(56)  References Cited

U.S. PATENT DOCUMENTS

| | | | | |
|---|---|---|---|---|
| 5,575,305 | A * | 11/1996 | Mieth | F16K 1/446 |
| | | | | 137/15.04 |
| 5,904,173 | A * | 5/1999 | Ozawa | F16K 1/446 |
| | | | | 251/63.5 |
| 6,098,645 | A * | 8/2000 | Brackelmann | F16K 1/446 |
| | | | | 137/15.01 |
| 6,178,986 | B1 | 1/2001 | Burmester | |
| 6,230,736 | B1 * | 5/2001 | Scheible | F16K 1/446 |
| | | | | 251/63.5 |
| 7,845,368 | B2 * | 12/2010 | Burmester | F16K 1/446 |
| | | | | 137/240 |
| 7,891,376 | B2 | 2/2011 | Neuhauser et al. | |
| 8,336,572 | B2 * | 12/2012 | Burmester | F16K 1/446 |
| | | | | 137/240 |
| 9,546,735 | B2 | 1/2017 | Burmester et al. | |
| 9,551,424 | B2 | 1/2017 | Burmester et al. | |
| 2010/0132822 | A1 | 6/2010 | Burmester et al. | |
| 2017/0042361 | A1 | 2/2017 | Kim | |

FOREIGN PATENT DOCUMENTS

| | | | | |
|---|---|---|---|---|
| EP | 0039319 | A1 | 11/1981 | |
| GB | 2119480 | A * | 11/1983 | F16K 1/446 |
| WO | 2017042361 | A1 | 3/2017 | |

OTHER PUBLICATIONS

O Processtec, "GEA, Mixproof Valves", https://processtec.com/mixproof-valves-overview--.html, exact publication date unknown, but prior to Oct. 15, 2021. (4 page).

International Search Report (PCT/ISA/210) with translation and Written Opinion (PCT/ISA/237) mailed on Jan. 3, 2023, by the European Patent Office as the International Searching Authority for International Application No. PCT/EP2022/078132. (13 pages).

\* cited by examiner

FLOW CONTROL ARRANGEMENT AND METHOD OF CLEANING SUCH AN ARRANGEMENT

FIELD OF INVENTION

The disclosure relates to a flow control arrangement. The disclosure also relates to a method of cleaning such a flow control arrangement.

TECHNICAL BACKGROUND

There are many different types of valve arrangements that are deployed in various industrial applications. The valve arrangements may comprise a control unit, an actuator arrangement, and a flow control arrangement, wherein the actuator arrangement may be controlled by the control unit and may be configured to control the flow control arrangement. One such kind valve arrangement includes a double valve member interacting with a double seat. Such a valve may e.g. be used as a mixing valve controlling whether or not two fluids are mixed with each other. Such valve arrangements may be controlled such that the different valve members may be moved separately from each other in order to facilitate cleaning.

Document WO 2017/042361 discloses a valve controller for controlling a valve arrangement which is configured to selectively close or open a connection between two pipe sections. The valve arrangement comprises two separate valve members, one upper and one lower valve member, which are movable partly independently relative each other and also together. In a closed position of the valve arrangement, each valve member seals against an associated seat, an upper seat and a lower seat, extending around the connection between the pipe sections. If any of the valve members does not close tightly against its associated seat, any fluid leaking through the non-tight seal will flow through the hollow lower valve member down to a drain. In an open position, both valve members are moved upwardly into the upper pipe section to open the connection between the two pipe section. In the open position, the two valve members are also sealingly brought together to prevent fluid from flowing between the valve members and into the hollow lower valve.

The valve controller is also configured set the valve members in a first cleaning position where lower valve member is pushed slightly downwardly such that it no longer seals against the lower seat and thereby exposes the lower valve seat while the upper valve member still is sealingly engaging the upper seat. In this position cleaning fluid may flow through the gap between the lower valve member and the lower seat and thereby clean these surfaces. This flow of cleaning fluid may be drained through the hollow lower valve member down to a drain.

The valve controller is also configured set the valve members in a second cleaning position where upper valve member is lifted slightly upwardly such that it no longer seals against the upper seat and thereby exposes the upper valve seat while the lower valve member still is sealingly engaging the lower seat. In this position cleaning fluid may flow through the gap between the upper valve member and the upper seat and thereby clean these surfaces. This flow of cleaning fluid may be drained through the hollow lower valve member down to a drain.

However, sometimes there is a desire to provide a more simple or basic design which is cost-efficient, which still provides the basic function of providing a valve arrangement with a double valve and double seat, and which is capable of being cleaned in an efficient manner.

SUMMARY OF INVENTION

It is an object of the invention to provide a solution which adequately addresses the desire to provide a design which is easy to clean and which may be provided in a cost-efficient manner while still providing a basic function of providing a valve arrangement with a double valve and double seat.

This object has been achieved by a flow control arrangement comprising a first valve member being movable along a longitudinal direction into sealing engagement with a first valve seat and being movable along a direction opposite the longitudinal direction from said sealing engagement with a first valve seat, a second valve member being movable along the longitudinal direction into sealing engagement with a second valve seat and being movable along a direction opposite the longitudinal direction from said sealing engagement with a second valve seat, a first and a second conduit section each being configured to allow a respective flow of a fluid and being arranged beside each other as seen along the longitudinal direction, wherein the two conduit sections are interconnected by a mixing opening allowing a flow of fluid between the first and second conduit sections, wherein the first and second valve seats each extends around the mixing opening at two different and longitudinally separated positions, wherein the mixing opening is selectively closable and openable by a double valve formed by the first and second valve members, wherein in a closed state of the double valve, the first and second valve members are sealingly engaging the first and the second valve seat, respectively, with a longitudinal gap being present between the first and second valve members, wherein in an open state of the double valve, the first and the second valve members are brought out of engagement of the first and second valve seat, respectively, and into the second conduit section, wherein, in a change from the closed state to the open state, the first valve member is configured to be moved a longer distance compared to a movement of the second valve member, such that, in the open state, the first valve member sealingly engages the second valve member, wherein the first valve member comprises a first circumferentially extending gasket being configured to sealingly interact with the first seat in the closed state, and a second circumferentially extending gasket arranged further in the direction opposite the longitudinal direction than the first circumferentially extending gasket and being configured to sealingly interact with the second valve member in the open state, wherein the second valve member is, at an end facing the first valve member, formed with a circumferentially extending ring-shaped surface facing with a major component in the longitudinal direction, a recess being surrounded by the ring-shaped surface and being configured to receive a portion of the first valve member, and a circumferentially extending edge formed in a transition between the ring-shaped surface and the recess, wherein the second circumferentially extending gasket of the first valve member is configured to sealingly interact with the circumferentially extending edge of the second valve member when the double valve is in the open state.

By the second valve member having the circumferentially extending ring-shaped surface, the recess and the circumferentially extending edge in combination with the first valve member comprising the second circumferentially extending gasket sealingly interacting with the circumferentially extending edge in the open state, there is provided a double valve which is capable of being efficiently cleaned. Since the second circumferentially extending gasket interacts with the circumferentially extending edge, there is a reduction in the risk that any material from the flow of fluid in the second conduit section is caught between the valve members when the double valve is in the open state. Moreover, when the double valve is starting to be transferred from the closed state towards the open state, the first valve member will begin to move in the direction opposite the longitudinal direction and at least a fraction of the fluid in the first conduit section will flow in the cleaning gap thus formed between the first valve member and the first valve seat and past the second circumferentially extending gasket through the venting gap still remaining between the second circumferentially extending gasket and the circumferentially extending edge. By the second valve member having the circumferentially extending ring-shaped surface, the recess and the circumferentially extending edge in combination with the first valve member comprising the second circumferentially extending gasket sealingly interacting with the circumferentially extending edge in the open state, the flow of the fraction of the fluid in the first conduit section through the venting gap still remaining between the second circumferentially extending gasket and the circumferentially extending edge may flow past the edge and the second gasket without there being any portions where there is a significant blockage or any areas where there is formed still-standing volumes of the fluid. Thus, the design allows for an efficient flow of the fluid and thereby for an efficient cleaning of the surfaces. This is especially useful for designs of the flow control arrangement, where the actuator is not provided with a control option where the first and second valve members are separably controlled to allow for separate and dedicated cleaning modes.

Thus, the design of the flow control arrangement allows in turn for more simple design when it comes to the actuator. It has been found that with the above design it is possible to allow the actuator to simply be provided with a single maneuverability, namely by providing the actuator with a single air connection configured to supply pressurized air onto a piston when the actuator is intended to set the double valve in the open state. With the design of the flow control arrangement, the cleaning is efficient enough to be achieved in the short time-interval during a part of the movement of the valve members from the closed position to the open position. During the movement of the valve members from the closed position, the first valve member is first moved from its engagement with the first valve seat. This opens up a cleaning gap between the first valve member and the first valve seat allowing at least a fraction of the fluid in the first conduit section to flow through the cleaning gap and into the space between the first and second valve members and out through the venting channel. This flow through the cleaning gap, into the space between the first and second valve members and out through the venting channel is allowed until the first valve member has moved to such an extent in the direction opposite the longitudinal direction such that the second circumferentially extending gasket sealingly interacts with the circumferentially extending edge and thereby closes off the flow through a venting gap between the second circumferentially extending gasket and the circumferentially extending edge.

That the second circumferentially extending gasket is arranged further in the direction opposite the longitudinal direction than the first circumferentially extending gasket may also be worded that the second circumferentially extending gasket is arranged in the direction opposite the longitudinal direction in relation to the first circumferentially extending gasket. This may also be expressed by the extended phrasing that the first valve member comprises a first portion provided with a first circumferentially extending gasket being configured to sealingly interact with the first seat in the closed state, and a second portion arranged further in the direction opposite the longitudinal direction than the first portion of the first valve member, which second portion of the first valve member is provided with a second circumferentially extending gasket being configured to sealingly interact with the second valve member in the open state. The second circumferentially extending gasket is thereby arranged further in the direction opposite the longitudinal direction than the first circumferentially extending gasket. That the second portion of the first valve member is arranged further in the direction opposite the longitudinal direction than the first portion of the first valve member may also be worded that the second portion is arranged in the direction opposite the longitudinal direction in relation to the first portion.

The first valve member may, in a change from the closed state to the open state, be configured to be moved a longer distance in the direction opposite the longitudinal direction compared to the movement of the second valve member, more precisely compared to the movement of the second valve member in the direction opposite the longitudinal direction.

The first valve member may be arranged further in the longitudinal direction than the second valve member. This may also be worded that the first valve member may be arranged in the longitudinal direction in relation to the second valve member.

The first valve member may comprise a valve member section between the first circumferentially extending gasket and the second circumferentially extending gasket that extends further in the transverse direction (or further radially outwardly) than the first circumferentially extending gasket and the second circumferentially extending gasket, i.e. than the first gasket as well as than the second gasket. The valve member section of the first valve member may alternatively or in addition be described to be between the first portion of the first valve member and the second portion of the valve member, wherein the valve member section extends further in the transverse direction (or further radially outwardly) than the first portion and the second portion.

The first and the second conduit section may each extend in a transverse direction. The first and the second conduit section may each be configured to allow a respective flow of a fluid in a transverse direction. Thus, the first and the second conduit section may each extend in and be configured to allow a respective flow of a fluid in a transverse direction.

The first circumferentially extending gasket of the first valve member may be positioned in a first sealing surface of the first valve member, the first sealing surface facing in a direction having at least a component extending outwardly.

This sealing surface may in one embodiment be an axially extending surface and thereby form part of a so-called radial sealing between the first valve member and the first valve seat. The radial sealing may be designed such that it allows movement of the first valve member while still proving a sealing with the first valve seat. The first valve seat is in such an instant also an axially extending surface.

However, in a preferred embodiment the sealing between the first valve member and the first valve seat is a so-called axial seal, sometimes referred to as a face seal, in which the first gasket is pressed against the valve seat by a movement of the first valve member in the longitudinal direction. The sealing between the second valve member and the second valve seat may be a so-called axial seal. The sealing between the first and the second valve members may be a so-called axial seal.

It may in this context be noted that the various sealing surfaces referred to in this text all have a circumferential extension unless it is explicitly stated or explicitly apparent from the circumstances that such a circumferential extension is not applicable for a specific sealing surface. Each sealing surface defines in a sense a circumferentially extending geometrical strip having a respective width. The respective width of the respective strip formed by the respective sealing surface may however be oriented differently.

In this context some geometrical directions may be defined according to the following. The width of the strip may e.g. be oriented along the longitudinal direction such that the sealing surface forms a cylinder. This may alternatively be expressed as that the sealing surface faces inwardly or alternatively faces outwardly depending on if it is the inner or the outer surface. Inwardly refers to a direction pointing inwardly towards a central axis extending along the longitudinal direction. Outwardly refers to a direction pointing outwardly from the central axis. Inwardly may also be referred to as radially inwardly. Outwardly may also be referred to as radially outwardly.

The width of the strip may e.g. be oriented such that the width extends radially outwardly from the central axis. This may alternatively be expressed as that the sealings surface faces along the longitudinal direction or along the direction opposite the longitudinal direction depending on if it is the lower surface or the upper surface. In this context it may be noted that the flow control arrangement is typically configured to be arranged such that the longitudinal direction points downwardly. Thus, the first valve member may also be referred to as the lower valve member and the second valve member may also be referred to as the upper valve member.

In a preferred embodiment, the first sealing surface has a main extension along a conical geometrical envelope surface facing outwardly and along the longitudinal direction. Thus, the first sealing surface has a circumferential extension and the strip formed by the first sealing surface is oriented such that the first sealing surface follows a frustoconical geometrical body. A frustoconical first sealing surface is preferred since it may be designed to provide a self-centring of the first valve member and since it may provide a strong sealing effect relative to the first valve seat. The conical geometrical envelope surface of the first sealing surface provides a tapering of the first sealing surface in the longitudinal direction. The first gasket is preferably received in a circumferentially extending groove in the first sealing surface.

The second circumferentially extending gasket of the first valve member may be positioned in a second sealing surface of the first valve member, wherein the second sealing surface preferably has a main extension along a geometrical envelope surface facing outwardly and towards the second valve member in the direction opposite the longitudinal direction. The geometrical envelope surface is preferably a conical geometrical envelope surface. A frustoconical second sealing surface is preferred since it may be designed to provide a self-centring of the first valve member and since it may provide a strong sealing effect relative to the second valve member. The conical geometrical envelope surface of the second sealing surface provides a tapering of the first sealing surface in the direction opposite the longitudinal direction. The second gasket is preferably received in a circumferentially extending groove in the second sealing surface.

The first sealing surface may form an angle between 10° and 45° with the longitudinal direction. An angle in this interval is preferred since it allows the first sealing surface to interact with the first valve seat in such a way that the first valve member is guided towards its central position without having a tendency to be wedged stuck.

The second sealing surface may form an angle between 10° and 45° with the direction extending opposite the longitudinal direction. An angle in this interval is preferred since it allows the second sealing surface to interact with the circumferentially extending edge such that the valve members are guided towards their respective relative central positions without having a tendency to be wedged stuck to each other.

The second valve member may comprise a third circumferentially extending gasket being configured to sealingly interact with the second seat when the double valve is in the closed state. It may in this context be noted that the use of first, second and third is intended to be regarded as labels. The third gasket belonging to the second valve member does not indicate that there need to be a first and a second gasket belonging to the second valve member. This third gasket is a gasket which happened to be the third in order of introduction in this disclosure. The gaskets introduced as the first gasket and the second gasket belong in fact to the first valve member It may in this context also be noted that an explicit mention of e.g. a third gasket does not necessitate that there is a first and/or a second gasket present. Similarly, an explicit mention of a second gasket does not necessitate that there is a first gasket present. However, in order to facilitate reading we consistently use the labels first, second, third, etc. based on an embodiment in which all the elements are present, which is actually a preferred embodiment.

The third circumferentially extending gasket is preferably positioned in a circumferentially extending sealing surface surrounding the circumferentially extending ring-shaped surface. It may in this context be noted that the circumferentially extending sealing surface and the circumferentially extending ring-shaped surface can be in different positions along the longitudinal direction. The third circumferentially extending gasket is preferably received in a circumferentially extending groove in the circumferentially extending sealing surface.

The circumferentially extending sealing surface of the second valve member may have a main extension along a conical geometrical envelope surface facing outwardly and along the longitudinal direction. A frustoconical circumferentially extending sealing surface is preferred since it may be designed to provide a self-centring of the second valve member and since it may provide a strong sealing effect relative to the second valve seat. The conical geometrical envelope surface of the circumferentially extending sealing surface of the second valve member provides a tapering of the circumferentially extending sealing surface of the second valve member in the longitudinal direction.

The circumferentially extending sealing surface may form an angle between 10° and 45° with the longitudinal direction. An angle in this interval is preferred since it allows the circumferentially extending sealing surface of the second valve member to interact with the second valve seat in such a way that the second valve member is guided towards its central position without having a tendency to be wedged stuck.

The second valve member may comprise a longitudinally extending hollow valve stem and the first valve member may comprise a longitudinally extending valve stem extending inside the hollow valve stem of the second valve member, the valve stems extending in a direction opposite the longitudinal direction through and out through a wall of the second conduit section, thereby allowing the valve members to be mechanically maneuvered by an actuator being located on an outside of the conduit sections.

An annular venting channel may be formed between an inner surface of the hollow valve stem and an outside surface of the valve stem of the first valve member. The inner surface may also be referred to as a radially inner surface. The inner surface faces inwardly. The outer surface may also be referred to as a radially outwardly surface. The outer surface faces outwardly.

The venting channel may be provided with an annular inlet mouth thereof formed in the recess of the second valve member. This allows the venting channel to efficiently vent out fluid used to clean the space between the valve members.

The venting channel may be provided with a drain outlet mouth outside of the conduit sections. Thereby any fluid which deliberately has been guided or due to a leak enters into the space between the valve members may be vented out from the flow control arrangement, such as to a drain.

The flow control arrangement may further comprise an actuator comprising a piston cylinder arrangement with an air connection. The air connection may be configured to, in order to set the flow control arrangement in the open state, supply pressurized air to the piston cylinder arrangement such that a piston is moved in a direction opposite the longitudinal direction, the piston being connected to and thereby draw the first valve member in the direction opposite the longitudinal direction to the open state, wherein the second valve member is also drawn in the direction opposite the longitudinal direction to the open state by the first valve member contacting the second valve member in its movement in the direction opposite the longitudinal direction, wherein the second valve member in the open state is urged towards the first valve member by a compressed spring positioned between the piston and the second valve member. It may be noted that actuator may be of a robust design where the air connection may be the only air connection to the actuator, i.e. the actuator may comprise a single air connection. The design of the flow control arrangement makes it possible to provide an efficient cleaning although the cleaning in such a case typically only takes place in a short time period during the initial phase of the transition from the closed state to the open state.

The piston cylinder arrangement may further comprise a return spring configured to be compressed by the movement of the piston when the pressurized air is supplied and to return the piston and thereby also the first valve member to the closed state when the pressurized air is released.

The above object has also been achieved by a method of cleaning a flow control arrangement, the method comprising:

supplying a flow of a fluid in the first conduit section, moving the first valve member, from its position in the closed state in which the first valve member sealingly engages the first valve seat, preferably by moving the first valve member in the direction opposite the longitudinal direction towards its position in the open state, such that there is formed a cleaning gap between the first valve member and the first valve seat, and allowing at least a fraction of the flow of the fluid in the first conduit to flow through the cleaning gap between the first valve member and the first valve seat into a space between the first and second valve members and out through a venting channel formed in one of the valve members and thereby clean the venting channel and the space between the first and second valve members.

At least a fraction of the fluid in the first conduit section may be allowed to flow through a venting gap between the second circumferentially extending gasket and the circumferentially extending edge and into the space between the first and second valve members and out through the venting channel. More precisely, at least a fraction of the fluid in the first conduit section may be allowed to flow through the cleaning gap, through the venting gap, into the space between the first and second valve members and out through the venting channel.

It may be noted that the cleaning may depending upon the design of the actuator and the first valve seat be provided by moving the first valve member either along the longitudinal direction or in the direction opposite the longitudinal direction. However, in the preferred embodiment the first valve member is moved from its position in the closed state in the direction opposite the longitudinal direction towards its position in the open state, such that there is formed a cleaning gap between the first valve member and the first valve seat. As long as this cleaning gap is maintained and as long as the venting channel is not closed off by anything else, such as a closed off venting gap, the flow through cleaning gap and out via the venting channel is maintained.

The method may further comprise moving the first valve member, from its position in which there is formed a cleaning gap between the first valve member and the first valve seat, in the direction opposite the longitudinal direction, towards its position in the open state such that second circumferentially extending gasket sealingly interacts with the circumferentially extending edge and thereby closes off the flow through a venting gap between the second circumferentially extending gasket and the circumferentially extending edge and thereby close off the venting channel and the space between the first and second valve members. In the preferred embodiment, the first valve member is moved in a single stroke from its position in the closed state to its position in the open state. It may be noted that the flow through the venting gap and into the mouth of the venting channel is only present over a portion of the movement of the valve members from their positions in the closed state to their position in the open state. Preferably, the flow control arrangement is designed such that the second circumferentially extending gasket sealingly interacts with the circumferentially extending edge before the second valve member loses its sealing engagement with the second valve seat. The advantages have been discussed in detail with reference to the flow control arrangement and those advantages are equally applicable to the method of cleaning the flow control arrangement.

An embodiment of the flow control arrangement may also in short be said to relate to a flow control arrangement comprising a first and a second valve member, wherein the second valve member is, at an end facing the first valve member, formed with a circumferentially extending ring-shaped surface facing with a major component in a longitudinal direction, a recess being surrounded by the ring-shaped surface and being configured to receive a portion of the first valve member, and a circumferentially extending edge formed in a transition between the ring-shaped surface and the recess, wherein a second circumferentially extending gasket of the first valve member is configured to sealingly interact with the circumferentially extending edge of the second valve member when the double valve is in the open state.

BRIEF DESCRIPTION OF THE DRAWINGS

The invention will by way of example be described in more detail with reference to the appended schematic drawings, which shows a presently preferred embodiment of the invention.

FIG. 1a is a view of a flow control arrangement with a portion thereof being shown as a cross-section, the flow control arrangement being set in a closed state.

FIG. 1b is a complete cross-section of the flow control arrangement of FIG. 1a.

FIG. 2a is a view of a flow control arrangement with a portion thereof being shown as a cross-section, the flow control arrangement being set in an open state.

FIG. 2b is a complete cross-section of the flow control arrangement of FIG. 2a.

DETAILED DESCRIPTION OF PREFERRED EMBODIMENTS

Figure 1:
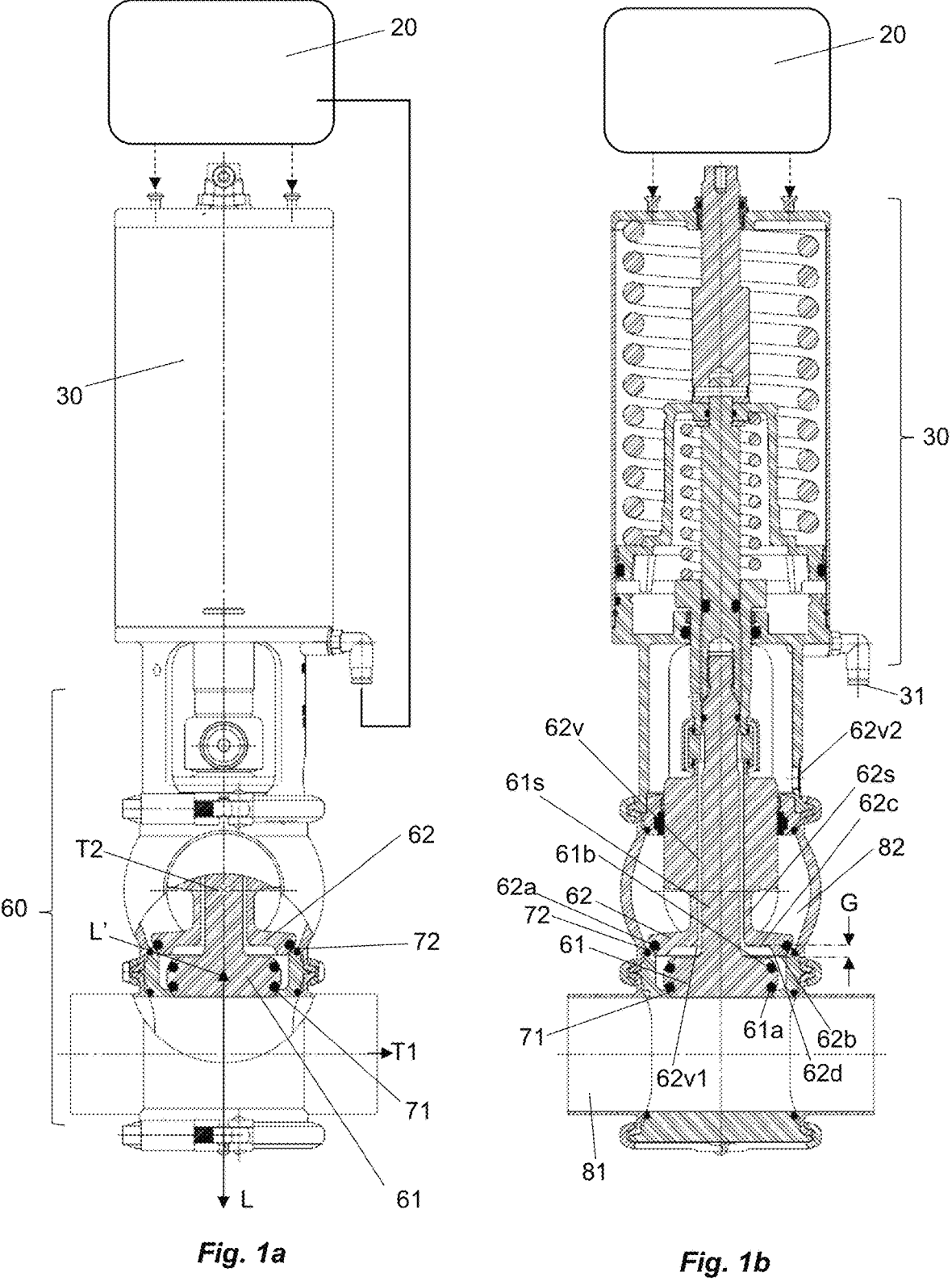
Figure 2:
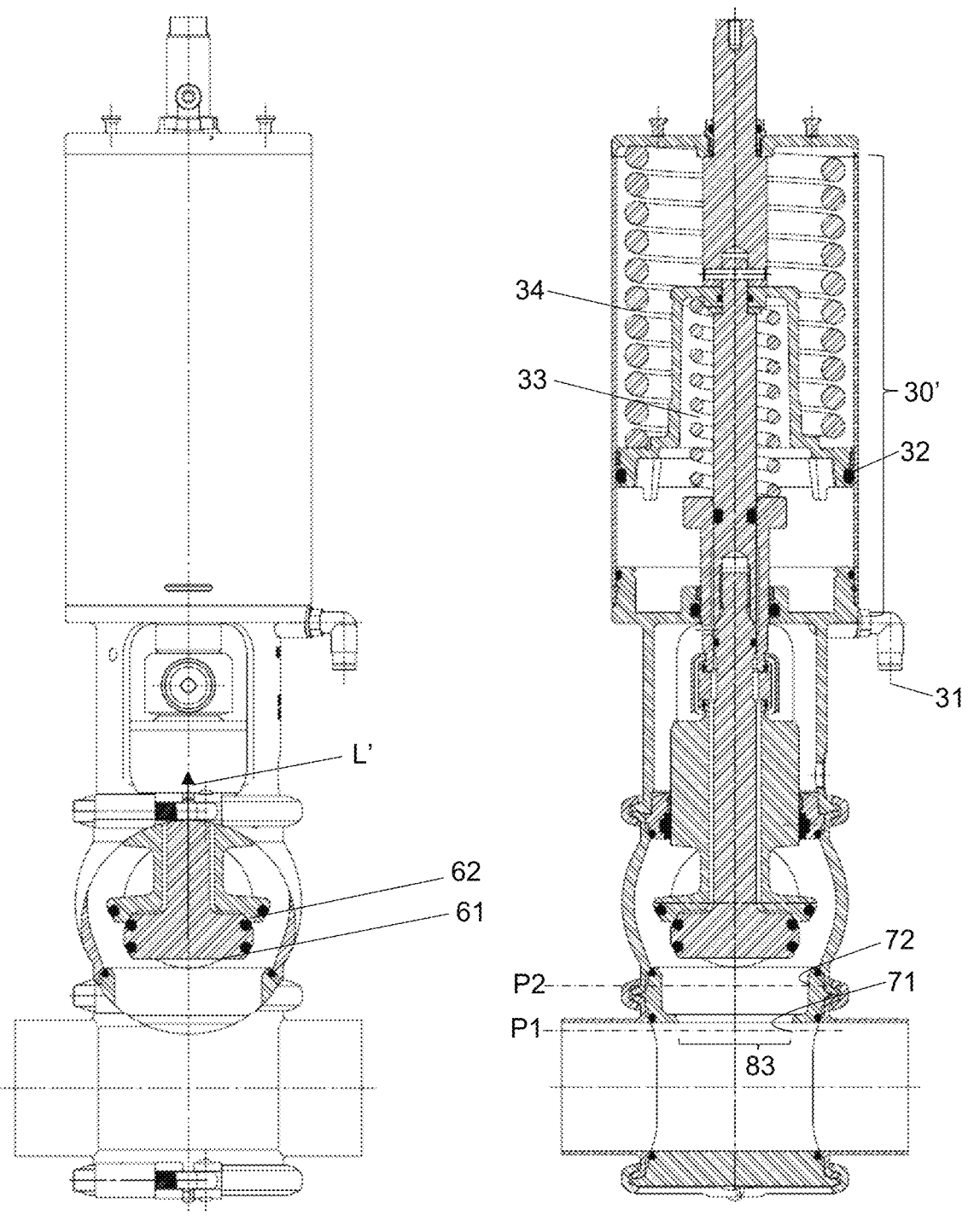

With reference to FIGS. 1 and 2, there is disclosed a flow control arrangement 60. As is e.g. shown in FIG. 1a, the flow control arrangement 60 comprises a first valve member 61 and a second valve member 62. The flow control arrangement 60 further comprises an actuator 30. The actuator 30 may be provided as an integral part of the flow control arrangement 60. Alternatively, the flow control arrangement 60 may be provided as a kit of parts, where the actuator 30 is a separate part configured to be attached to the flow control arrangement 60. The movements of the first valve member 61 and the second valve member 62 are controlled by the actuator 30 which in turn is controlled by a control unit 20. The control unit 20 is connected to a source of pressurized gas, such as pressurized air, and comprises electronic circuitry. The electronic circuitry controls valves of the control unit such that the control unit may selectively provide pressurized air to one or more connections of the actuator 30. The actuator 30 transforms the selective provision of pressurized air to mechanical work. The actuator 30 is mechanically connected to the flow control arrangement 60. The control unit 20 may be provided as an integral part of the flow control arrangement 60. Alternatively, the control unit 20 may be provided as a separate part, preferably configured to be attached to the actuator 30; irrespective of if the actuator 30 is an integral part of the flow control arrangement 60 or a separate part configured to be attached to the flow control arrangement 60. Alternatively, the actuator 30 and control unit 20 is an integral part in turn being configured to be attached to the flow control arrangement 60.

Figure 3:
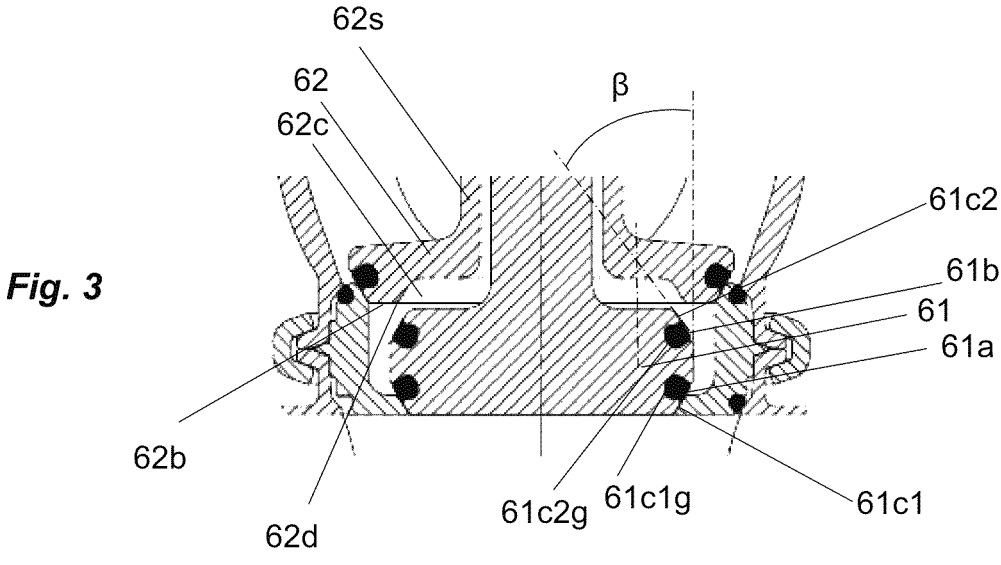
FIG. 3 is an enlargement of a portion of FIG. 1a and discloses the flow control arrangement in a closed state.
Figure 4:
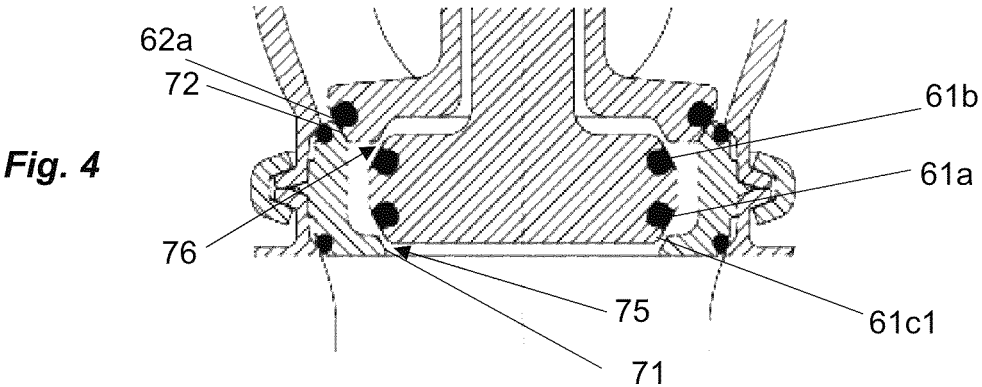
FIG. 4 discloses the same components as FIG. 3, but discloses the flow control arrangement in an intermediate cleaning state.
Figure 5:
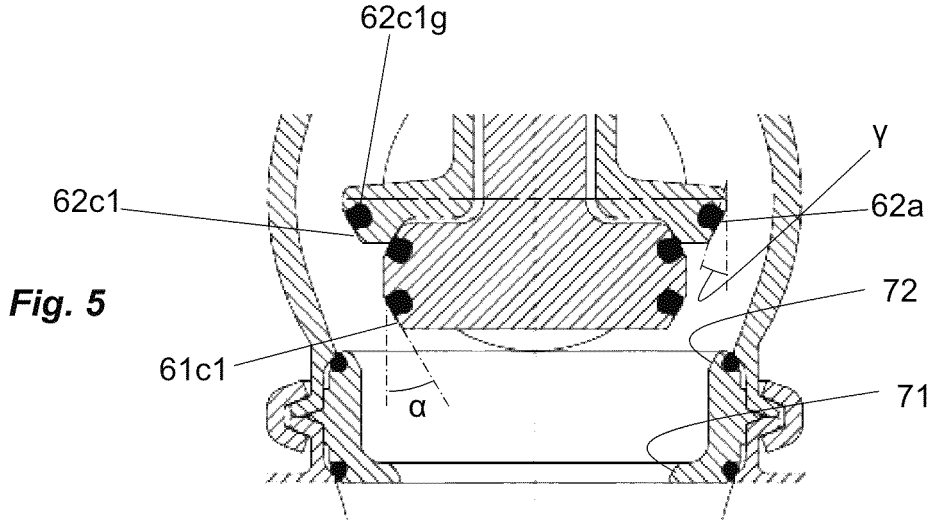
FIG. 5 discloses the same components as FIGS. 3 and 4, but discloses the flow control arrangement in an open state.

As is e.g. shown in FIG. 1a, the flow control arrangement 60 comprises a first valve member 61 and a second valve member 62. As is best shown in FIGS. 3-5, the first valve member 61 is movable along a longitudinal direction L into sealing engagement with a first valve seat 71 as shown in FIG. 3 and is also movable along a direction L' opposite the longitudinal direction L from said sealing engagement with a first valve seat 71 as shown in FIG. 5. Similarly, the second valve member 62 is movable along the longitudinal direction L into sealing engagement with a second valve seat 72 and being movable along a direction L' opposite the longitudinal direction L from said sealing engagement with a second valve seat 72.

As shown in FIGS. 1b and 2b, the flow control arrangement 60 further comprises a first and a second conduit section 81, 82. The conduit sections each extends in and is configured to allow a respective flow of a fluid in a transverse direction T1, T2. The conduit sections 81, 82 are arranged beside each other as seen along the longitudinal direction L.

It is to be noted that in the flow control arrangement 60 shown in the figures, the first and the second conduit sections each extends in a transverse direction T1, T2 and thereby allows a respective flow of a fluid in the transverse directions T1, T2. The transverse directions T1 and T2 are transverse in relation to the longitudinal direction L.

However, in this context it may be noted that the conduit sections 81, 82 may have numerous different configurations when it comes to their extension. The conduit sections may, independent of each other, extend in a direction having a component in the longitudinal direction L and/or the direction L' opposite to the longitudinal direction. The conduit sections may, independent of each other, extend in a direction having a component in a transverse direction T1, T2, i.e. in a transverse direction T1, T2 being transverse in relation to the longitudinal direction L. The conduit sections may, independent of each other, extend in a direction having a component in the longitudinal direction L and/or the direction L' opposite to the longitudinal direction as well as a component in a transverse direction T1, T2, i.e. in a transverse direction T1, T2 being transverse in relation to the longitudinal direction L.

The conduit sections may, independent of each other, be bent or straight. One, or both, of the conduit sections may be bent such that the inlet portion of the conduit section extends along a first transverse direction and the outlet portion of the conduit section extends along a second transverse direction, being different from the first transverse direction.

When it comes to the extension of the conduit sections 81, 82 in the transverse direction or directions T1, T2, the transverse directions may form any angle with each other. The two transverse directions may e.g. be parallel to each other. The transverse directions may both extend along straight lines and extend in parallel with each other, i.e. both extending in one and the same transverse direction. The transverse directions may both extend along straight lines but along different transverse directions. It may be noted that the transverse directions may be orthogonal to each other as shown in the figures.

As is best shown in FIG. 2*b*, the two conduit sections 81, 82 are interconnected by a mixing opening 83 allowing a flow of fluid between the first and second conduit sections 81, 82.

The first and second valve seats 71, 72 each extends around the mixing opening 83 at two different and longitudinally separated positions P1, P2. The mixing opening 83 is selectively closable and openable by a double valve formed by the first and second valve members 61, 62.

In a closed state of the double valve, as shown in FIGS. 1*a-b*, and 3, the first and second valve members 61, 62 are sealingly engaging the first and the second valve seat 71, 72, respectively, with a longitudinal gap G being present between the first and second valve members 61, 62. The first valve member 61 comprises a first circumferentially extending gasket 61*a* being configured to sealingly interact with the first seat 71 in the closed state of the double valve. The second valve member 62 comprises a circumferentially extending gasket 62*a*, in the disclosure also referred to as a third gasket 62*a*, being configured to sealingly interact with the second seat 72 when the double valve is in the closed state.

In an open state of the double valve, as shown in FIGS. 2*a-b*, and 5, the first and the second valve members 61, 62 are brought out of engagement of the first and second valve seat 71, 72, respectively, and into the second conduit section 82.

It may be noted that in a change from the closed state to the open state, the first valve member 61 is configured to be moved a longer distance compared to a movement of the second valve member 62, such that, in the open state, the first valve member 61 sealingly engages the second valve member 62. This movement along a longer distance overcomes at least a part of the longitudinal gap G. It may be noted that there may still remain a longitudinal gap G between some portions of the valve members 61, 62 as long as a portion of the first valve member 61 sealingly engages a portion of the second valve member 62. The first valve member 61 comprises a second circumferentially extending gasket 61*b* being configured to sealingly interact with the second valve member 62 in the open state of the double valve.

The second valve member 62 is, at an end facing the first valve member 61, formed with a circumferentially extending ring-shaped surface 62*b* facing with a major component in the longitudinal direction L, a recess 62*c* being surrounded by the ring-shaped surface 62*b* and being configured to receive a portion of the first valve member 61, and a circumferentially extending edge 62*d* formed in a transition between the ring-shaped surface 62*b* and the recess 62*c*.

The second circumferentially extending gasket 61*b* of the first valve member 61 is configured to sealingly interact with the circumferentially extending edge 62*d* of the second valve member 62 when the double valve is in the open state.

The flow control arrangement 60 is intended to be cleaned in accordance with the following. During the movement of the valve members 61, 62 from the closed position, the first valve member 61 is first moved from its engagement with the first valve seat 71. As is best shown in FIG. 3, this opens up a cleaning gap 75 between the first valve member 61 and the first valve seat 71 allowing at least a fraction of the fluid in the first conduit section 81 to flow through the cleaning gap 75 and into the space between the first and second valve members 61, 62 and out through the venting channel 62*v*. There is also a venting gap 76 between the second circumferentially extending gasket 61*b* and the circumferentially extending edge 62*d*. Thus, more precisely, at least a fraction of the fluid in the first conduit section 81 is allowed to flow through the cleaning gap 75, through the venting gap 76, into the space between the first and second valve members 61, 62 and out through the venting channel 62*v*. This flow through the cleaning gap 75, into the space between the first and second valve members 61, 62 and out through the venting channel 62*v* is allowed until the first valve member 61 has moved to such an extent in the direction L' opposite the longitudinal direction L such that the second circumferentially extending gasket 61*b* sealingly interacts with the circumferentially extending edge 62*d* and thereby closes off the flow through the venting gap 76 between the second circumferentially extending gasket 61*b* and the circumferentially extending edge 62*d*.

In a preferred embodiment the sealing between the first valve member 61 and the first valve seat 71 is a so-called axial seal, sometimes referred to as a face seal, in which the gasket 61*a* is pressed against the valve seat 71 by a movement of the first valve member 61 in the longitudinal direction L. The first sealing surface 61*c*1 has a main extension along a conical geometrical envelope surface facing outwardly and along the longitudinal direction L. Thus, the first sealing surface 61*c*1 has a circumferential extension and the strip formed by the first sealing surface 61*c*1 is oriented such that the first sealing surface 61*c*1 follows a frustoconical geometrical body. The gasket 61*a* is received in a circumferentially extending groove 61*c*1*g* in the first sealing surface 61*c*1.

The second circumferentially extending gasket 61*b* of the first valve member 61 may be positioned in a second sealing surface 61*c*2 of the first valve member 61, wherein the second sealing surface 61*c*2 preferably has a main extension along a geometrical envelope surface facing outwardly and towards the second valve member 62 in the direction L' opposite the longitudinal direction L. The gasket 61*b* is received in a circumferentially extending groove 61*c*2*g* in the second sealing surface 61*c*2.

The first sealing surface 61*c*1 forms an angle $\alpha$ between 10° and 45° with the longitudinal direction L. The second sealing surface 61*c*2 forms an angle $\beta$ between 10° and 45° with the direction L' extending opposite the longitudinal direction L. In the preferred embodiment, the first and second sealing surfaces 61*c*1, 61*c*2 are symmetrical in the sense that they have the same angle. Preferably they are also symmetrical in the sense that the grooves 61*c*1*g*, 61*c*2*g* also are symmetrically positioned such that they have the same circumferential extension and the same shape and thereby being designed receive the same kind of gasket. This facilitates manufacture and maintenance.

As introduced above, the second valve member 62 comprises a third circumferentially extending gasket 62*a* being configured to sealingly interact with the second seat 72 when the double valve is in the closed state.

The third circumferentially extending gasket 62*a* is positioned in a circumferentially extending sealing surface 62*c*1 surrounding the circumferentially extending ring-shaped surface 62*b*. The third circumferentially extending gasket 62*a* is received in a circumferentially extending groove 62*c*1*g* in the circumferentially extending sealing surface 62*c*1.

The circumferentially extending sealing surface 62*c*1 of the second valve member 62 has a main extension along a conical geometrical envelope surface facing outwardly and along the longitudinal direction L. The circumferentially extending sealing surface 62*c*1 forms an angle $\gamma$ between 10° and 45° with the longitudinal direction L.

The second valve member 62 comprises a longitudinally extending hollow valve stem 62s and the first valve member 61 comprises a longitudinally extending valve stem 61s extending inside the hollow valve stem 62s of the second valve member 62. The valve stems 61s, 62s extends in a direction L' opposite the longitudinal direction L through and out through a wall of the second conduit section 82. As is best shown in FIGS. 1*b* and 2*b*, this allows the valve members 61, 62 to be mechanically maneuvered by an actuator 30 being located on an outside of the conduit sections 81, 82.

An annular venting channel 62v may be formed in the second valve member 62 or more precisely between an inner surface of the hollow valve stem 62s and an outer surface of the valve stem 61s of the first valve member 61. As is best shown in FIGS. 1*a-b*, and 3, the venting channel 62v is provided with an annular inlet mouth 62v1 thereof formed in the recess 62c of the second valve member 62. This allows the venting channel 62v to efficiently vent out fluid used to clean the space between the valve members 61, 62. The venting channel 62v is also provided with a drain outlet mouth 62v2 outside of the conduit sections 81, 82. Thereby any fluid which deliberately has been guided or due to a leak enters into the space between the valve members 61, 62 may be vented out from the flow control arrangement 60, such as to a drain.

The design of the flow control arrangement 60 allows for a simple design when it comes to the actuator 30. It has been found that with the above design it is possible to allow the actuator 30 to simply be provided with a single maneuverability, namely by providing the actuator 30 with a single air connection 31 configured to supply pressurized air onto a piston 32 when the actuator 30 is intended to set the double valve in the open state. With the design of the flow control arrangement 60, the cleaning is efficient enough to be achieved in the short time-interval during a part of the movement of the valve members from the closed position to the open position.

With reference to FIG. 2*b*, the flow control arrangement 60 comprises an actuator 30 comprising a piston cylinder arrangement 30' with an air connection 31. The air connection 31 may be configured to, in order to set the flow control arrangement 60 in the open state, supply pressurized air to the piston cylinder arrangement such that a piston 32 is moved in a direction L' opposite the longitudinal direction L. The piston 32 is connected to and thereby draws the first valve member 61 in the direction L' opposite the longitudinal direction L to the open state.

In the beginning of the movement, the first valve member 61 is moved without the second valve member 62 being affected. This results in the situation shown in FIG. 4 which also may be referred to as a cleaning position.

As the first valve member 61 is drawn further in the direction L' opposite the longitudinal direction L, the first valve member 61 comes into contact with the second valve member 62, whereafter the second valve member 62 is also drawn in the direction L' opposite the longitudinal direction L to the open state by the first valve member 61 contacting the second valve member 62 in its movement in the direction L' opposite the longitudinal direction L.

The actuator 30 also comprises a spring 33 which urges the second valve member 62 in the open state towards the first valve member 61. The spring 33 is a compressed spring 33 positioned between the piston 32 and the second valve member 62.

It may be noted that the actuator 30 shown in the drawings is not designed such that it keeps the first valve member 61 in the cleaning position but is designed to in a single stroke move the first valve member 61 and also the second valve member 62 from the closed state to the open state.

However, the design of the flow control arrangement 60 makes it possible to provide an efficient cleaning although the cleaning in such a case typically only takes place in a short time period during the initial phase of the transition from the closed state to the open state.

The piston cylinder arrangement 30' further comprises a return spring 34 configured to be compressed by the movement of the piston 32 when the pressurized air is supplied and to return the piston 32 and thereby also the first valve member 61 to the closed state when the pressurized air is released.

Figure 6:
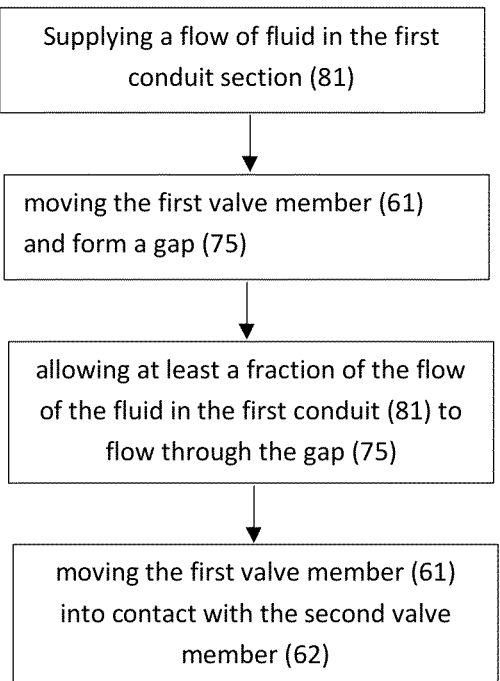
FIG. 6 discloses schematically a method of cleaning a flow control arrangement.

With reference to FIG. 6, there is also disclosed a method of cleaning a flow control arrangement 60. The method comprises supplying a flow of a fluid in the first conduit section 81, moving the first valve member 61, from its position in the closed state in which the first valve member 61 sealingly engages the first valve seat 71, preferably by moving the first valve member 61 in the direction L' opposite the longitudinal direction L towards its position in the open state, such that there is formed a cleaning gap 75 between the first valve member 61 and the first valve seat 71, and allowing at least a fraction of the flow of the fluid in the first conduit 81 to flow through the cleaning gap 75 between the first valve member 61 and the first valve seat 71 into a space between the first and second valve members 61, 62 and out through a venting channel 62v formed in one of the valve members 61, 62 and thereby clean the venting channel 62v and the space between the first and second valve members 61, 62.

It may be noted that the cleaning may depending upon the design of the actuator 30 and the first valve seat 71 be provided by moving the first valve member 61 either along the longitudinal direction L or in the direction opposite the longitudinal direction L'. However, in the preferred embodiment the first valve member 61 is moved from its position in the closed state in the direction L' opposite the longitudinal direction L towards its position in the open state, such that there is formed a cleaning gap 75 between the first valve member 61 and the first valve seat 71. As long as this cleaning gap 75 is maintained and as long as the venting channel 62v is not closed off by anything else, the flow through the cleaning gap 75 and out via the venting channel 62v is maintained.

The method further comprises moving the first valve member 61, from its position in which there is formed a cleaning gap 75 between the first valve member 61 and the first valve seat 71, in the direction L' opposite the longitudinal direction L, towards its position in the open state such that the second circumferentially extending gasket 61b sealingly interacts with the circumferentially extending edge 62d and thereby closes off the flow through a venting gap between the second circumferentially extending gasket and the circumferentially extending edge and thereby close off the venting channel 62v and the space between the first and second valve members 61, 62.

In the preferred embodiment of the actuator 30, the first valve member 61 is moved in a single stroke from its position in the closed state to its position in the open state.

It may be noted that the flow through the venting gap 76 and into the mouth 62v1 of the venting channel 62v is only present over a portion of the movement of the valve members from their positions in the closed state to their position in the open state. Preferably, the flow control arrangement 60 is designed such that the second circumferentially extending gasket 61*b* sealingly interacts with the circumferentially extending edge 62*d* before the second valve member 62 loses its sealing engagement with the second valve seat 72.

It is contemplated that there are numerous modifications of the embodiments described herein, which are still within the scope of the invention as defined by the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

As mentioned above, the first circumferentially extending gasket 61*a* of the first valve member 61 is positioned in a first sealing surface 61*c*1 of the first valve member 61. This first sealing surface 61*c*1 may in one embodiment be an axially extending surface 61*c*1 and thereby form part of a so-called radial sealing between the first valve member 61 and the first valve seat 71. The radial sealing may be designed such that it allows movement of the first valve member 61 while still proving a sealing with the first valve seat 71. The first valve seat 71 is in such an instant also an axially extending surface.

The invention claimed is:

1. A flow control arrangement comprising
   a first valve member being movable along a longitudinal direction into sealing engagement with a first valve seat and being movable along a direction opposite the longitudinal direction from said sealing engagement with the first valve seat,
   a second valve member being movable along the longitudinal direction into sealing engagement with a second valve seat and being movable along the direction opposite the longitudinal direction from said sealing engagement with the second valve seat,
   a first and a second conduit section each being configured to allow a respective flow of a fluid and being arranged beside each other as seen along the longitudinal direction, wherein the first and second conduit sections are interconnected by a mixing opening allowing a flow of fluid between the first and second conduit sections, wherein the first and second valve seats each extends around the mixing opening at two longitudinally separated positions, wherein the mixing opening is selectively closable and openable by a double valve formed by the first and second valve members,
   wherein in a closed state of the double valve, the first and second valve members are sealingly engaging the first and the second valve seat, respectively, with a longitudinal gap being present between the first and second valve members,
   wherein in an open state of the double valve, the first and the second valve members are brought out of engagement of the first and second valve seat, respectively, and into the second conduit section,
   wherein, in a change from the closed state to the open state, the first valve member is configured to be moved a longer distance compared to a movement of the second valve member, such that, in the open state, the first valve member sealingly engages the second valve member, wherein the first valve member comprises a first circumferentially extending gasket being configured to sealingly interact with the first valve seat in the closed state, and a second circumferentially extending gasket arranged further in the direction opposite the longitudinal direction than the first circumferentially extending gasket and being configured to sealingly interact with the second valve member in the open state,
   wherein the second valve member is, at an end facing the first valve member, formed with
      a circumferentially extending ring-shaped surface facing with a major component in the longitudinal direction,
      a recess being surrounded by the ring-shaped surface and being configured to receive a portion of the first valve member, and
      a circumferentially extending edge formed in a transition between the ring-shaped surface and the recess,
   wherein the second circumferentially extending gasket of the first valve member is configured to sealingly interact with the circumferentially extending edge of the second valve member when the double valve is in the open state to thereby close off the flow of the fluid between the second circumferentially extending gasket and the circumferentially extending edge of the second valve member,
   the circumferentially extending ring-shaped surface being configured so that the circumferentially extending ring-shaped surface is radially outward of a radially outermost part of the second circumferentially extending gasket when the second circumferentially extending gasket sealingly interacts with the circumferentially extending edge of the second valve member.

2. A flow control arrangement according to claim 1, wherein the first and the second conduit section each extends in and is configured to allow the respective flow of the fluid in a transverse direction.

3. A flow control arrangement according to claim 1, wherein the second circumferentially extending gasket of the first valve member is positioned in a second sealing surface of the first valve member, wherein the second sealing surface has a main extension along a geometrical envelope surface facing outwardly and towards the second valve member in the direction opposite the longitudinal direction.

4. A flow control arrangement according to claim 3, wherein the second sealing surface forms an angle between 10° and 45° with the direction extending opposite the longitudinal direction.

5. A flow control arrangement according to claim 1, further comprising
   an actuator comprising a piston cylinder arrangement with an air connection,
   wherein the air connection is configured to, in order to set the flow control arrangement in the open state, supply pressurized air to the piston cylinder arrangement such that a piston is moved in the direction opposite the longitudinal direction, the piston being connected to and thereby draw the first valve member in the direction opposite the longitudinal direction to the open state, wherein the second valve member is also drawn in the direction opposite the longitudinal direction to the open state by the first valve member contacting the second valve member in its movement in the direction opposite the longitudinal direction, wherein the second valve member in the open state is urged towards the first valve member by a compressed spring positioned between the piston and the second valve member.

6. A flow control arrangement according to claim 5, wherein the piston cylinder arrangement further comprises a return spring configured to be compressed by the movement of the piston when the pressurized air is supplied and to return the piston and thereby also the first valve member to the closed state when the pressurized air is released.

7. Method of cleaning a flow control arrangement according to claim 1, the method comprising:

supplying a flow of a fluid in the first conduit section, moving the first valve member, from its position in the closed state in which the first valve member sealingly engages the first valve seat such that there is formed a cleaning gap between the first valve member and the first valve seat, and allowing at least a fraction of the flow of the fluid in the first conduit to flow through the cleaning gap between the first valve member and the first valve seat into a space between the first and second valve members and out through a venting channel formed in one of the valve members and thereby clean the venting channel and the space between the first and second valve members.

8. Method according to claim 7, further comprising:

moving the first valve member, from its position in which there is formed the cleaning gap between the first valve member and the first valve seat, in the direction opposite the longitudinal direction, towards its position in the open state such that the second circumferentially extending gasket sealingly interacts with the circumferentially extending edge and thereby closes off the flow through a venting gap between the second circumferentially extending gasket and the circumferentially extending edge and thereby close off the venting channel and the space between the first and second valve members.

9. A flow control arrangement according to claim 1, wherein the first valve member comprises a longitudinally extending valve stem that extends away from the first valve member and passes through the second valve member.

10. A flow control arrangement according to claim 9, wherein the longitudinally extending valve stem extends away from the first valve member in a direction opposite the longitudinal direction.

11. A flow control arrangement according to claim 1, wherein the first circumferentially extending gasket of the first valve member is positioned in a first sealing surface of the first valve member, the first sealing surface facing in a facing direction having at least a component extending outwardly.

12. A flow control arrangement according to claim 11, wherein the first sealing surface has a main extension along a conical geometrical envelope surface facing outwardly and along the longitudinal direction.

13. A flow control arrangement according to claim 12, wherein the first sealing surface forms an angle between 10° and 45° with the longitudinal direction.

14. A flow control arrangement according to claim 1, wherein the second valve member comprises a longitudinally extending hollow valve stem and the first valve member comprises a longitudinally extending valve stem extending inside the longitudinally extending hollow valve stem of the second valve member, the longitudinally extending hollow valve stem and the longitudinally extending valve stem extending in the direction opposite the longitudinal direction through and out through a wall of the second conduit section, thereby allowing the valve members to be mechanically manoeuvred by an actuator being located on an outside of the conduit sections.

15. A flow control arrangement according to claim 14, wherein an annular venting channel is formed between an inner surface of the longitudinally extending hollow valve stem and an outer surface of the longitudinally extending valve stem of the first valve member.

16. A flow control arrangement according to claim 15, wherein the venting channel is provided with an annular inlet mouth thereof formed in the recess of the second valve member.

17. A flow control arrangement according to claim 15, wherein the venting channel is provided with a drain outlet mouth outside of the first and second conduit sections.

18. A flow control arrangement according to claim 1, wherein the second valve member comprises a third circumferentially extending gasket being configured to sealingly interact with the second seat when the double valve is in the closed state.

19. A flow control arrangement according to claim 18, wherein the third circumferentially extending gasket is positioned in a circumferentially extending sealing surface surrounding the circumferentially extending ring-shaped surface.

20. A flow control arrangement according to claim 19, wherein the circumferentially extending sealing surface has a main extension along a conical geometrical envelope surface facing outwardly and along the longitudinal direction.

21. A flow control arrangement according to claim 20, wherein the circumferentially extending sealing surface forms an angle between 10° and 45° with the longitudinal direction.

22. A flow control arrangement comprising a first valve member being movable along a longitudinal direction into sealing engagement with a first valve seat and being movable along a direction opposite the longitudinal direction from said sealing engagement with the first valve seat, a second valve member being movable along the longitudinal direction into sealing engagement with a second valve seat and being movable along the direction opposite the longitudinal direction from said sealing engagement with the second valve seat, a first and a second conduit section each being configured to allow a respective flow of a fluid and being arranged beside each other as seen along the longitudinal direction, wherein the first and second conduit sections are interconnected by a mixing opening allowing a flow of fluid between the first and second conduit sections, wherein the first and second valve seats each extends around the mixing opening at two longitudinally separated positions, wherein the mixing opening is selectively closable and openable by a double valve formed by the first and second valve members, wherein in a closed state of the double valve, the first and second valve members are sealingly engaging the first and the second valve seat, respectively, with a longitudinal gap being present between the first and second valve members, wherein in an open state of the double valve, the first and the second valve members are brought out of engagement of the first and second valve seat, respectively, and into the second conduit section, wherein, in a change from the closed state to the open state, the first valve member is configured to be moved a longer distance compared to a movement of the second valve member, such that, in the open state, the first valve member sealingly engages the second valve member, wherein the first valve member comprises a first circumferentially extending gasket being configured to sealingly interact with the first valve seat in the closed state, and a second circumferentially extending gasket arranged further in the direction opposite the longitudinal direction than the first circumferentially extending gasket and being configured to sealingly interact with the second valve member in the open state, wherein the second valve member is, at an end facing the first valve member, formed with a circumferentially extending ring-shaped surface facing with a major component in the longitudinal direction, a recess being surrounded by the ring-shaped surface and being configured to receive a portion of the first valve member, and a circumferentially extending edge formed in a transition between the ring-shaped surface and the recess, wherein the second circumferentially extending gasket of the first valve member is configured to sealingly interact with the circumferentially extending edge of the second valve member when the double valve is in the open state, wherein the second valve member comprises a longitudinally extending hollow valve stem and the first valve member comprises a longitudinally extending valve stem extending inside the longitudinally extending hollow valve stem of the second valve member.

23. A flow control arrangement according to claim 22, wherein the longitudinally extending hollow valve stem and the longitudinally extending valve stem extend in a direction opposite the longitudinal direction through and out through a wall of the second conduit section, thereby allowing the valve members to be mechanically manoeuvred by an actuator being located on an outside of the conduit sections.

24. A flow control arrangement comprising a first valve member being movable along a longitudinal direction into sealing engagement with a first valve seat and being movable along a direction opposite the longitudinal direction from said sealing engagement with the first valve seat, a second valve member being movable along the longitudinal direction into sealing engagement with a second valve seat and being movable along the direction opposite the longitudinal direction from said sealing engagement with the second valve seat, a first and a second conduit section each being configured to allow a respective flow of a fluid and being arranged beside each other as seen along the longitudinal direction, wherein the first and second conduit sections are interconnected by a mixing opening allowing a flow of fluid between the first and second conduit sections, wherein the first and second valve seats each extends around the mixing opening at two longitudinally separated positions, wherein the mixing opening is selectively closable and openable by a double valve formed by the first and second valve members, an actuator comprising a piston cylinder arrangement with an air connection, wherein in a closed state of the double valve, the first and second valve members are sealingly engaging the first and the second valve seat, respectively, with a longitudinal gap being present between the first and second valve members, wherein in an open state of the double valve, the first and the second valve members are brought out of engagement of the first and second valve seat, respectively, and into the second conduit section, wherein, in a change from the closed state to the open state, the first valve member is configured to be moved a longer distance compared to a movement of the second valve member, such that, in the open state, the first valve member sealingly engages the second valve member, wherein the first valve member comprises a first circumferentially extending gasket being configured to sealingly interact with the first valve seat in the closed state, and a second circumferentially extending gasket arranged further in the direction opposite the longitudinal direction than the first circumferentially extending gasket and being configured to sealingly interact with the second valve member in the open state, wherein the second valve member is, at an end facing the first valve member, formed with a circumferentially extending ring-shaped surface facing with a major component in the longitudinal direction, a recess being surrounded by the ring-shaped surface and being configured to receive a portion of the first valve member, and a circumferentially extending edge formed in a transition between the ring-shaped surface and the recess, wherein the second circumferentially extending gasket of the first valve member is configured to sealingly interact with the circumferentially extending edge of the second valve member when the double valve is in the open state, wherein the air connection is configured to, in order to set the flow control arrangement in the open state, supply pressurized air to the piston cylinder arrangement such that a piston is moved in the direction opposite the longitudinal direction, the piston being connected to and thereby draw the first valve member in the direction opposite the longitudinal direction to the open state, wherein the second valve member is also drawn in the direction opposite the longitudinal direction to the open state by the first valve member contacting the second valve member in its movement in the direction opposite the longitudinal direction, wherein the second valve member in the open state is urged towards the first valve member by a compressed spring positioned between the piston and the second valve member.

* * * * *